United States Patent
Tamatani et al.

(10) Patent No.: US 12,476,054 B2
(45) Date of Patent: Nov. 18, 2025

(54) SOLID ELECTROLYTIC CAPACITOR ELEMENT HAVING A NEGATIVE CONDUCTOR LAYER THAT DOES NOT COVER A PART OF A CARBON LAYER, AND SOLID ELECTROLYTIC CAPACITOR

(71) Applicant: Murata Manufacturing Co., Ltd., Nagaokakyo (JP)

(72) Inventors: Yasuhiro Tamatani, Nagaokakyo (JP); Kazuya Kusuda, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 146 days.

(21) Appl. No.: 18/539,769

(22) Filed: Dec. 14, 2023

(65) Prior Publication Data

US 2024/0120155 A1    Apr. 11, 2024

Related U.S. Application Data

(63) Continuation of application No. PCT/JP2022/021914, filed on May 30, 2022.

(30) Foreign Application Priority Data

Jun. 15, 2021 (JP) .................. 2021-099701

(51) Int. Cl.
    H01G 9/15    (2006.01)
    H01G 9/025   (2006.01)
    H01G 9/048   (2006.01)

(52) U.S. Cl.
    CPC ............ *H01G 9/15* (2013.01); *H01G 9/025* (2013.01); *H01G 9/048* (2013.01)

(58) Field of Classification Search
    None
    See application file for complete search history.

(56) References Cited

U.S. PATENT DOCUMENTS 6,128,180 A    10/2000  Araki et al.
2003/0026064 A1*  2/2003  Nakada .................. H01G 9/15
                                                      361/523

(Continued)

FOREIGN PATENT DOCUMENTS

JP    H06140291 A    5/1994
JP    H11168034 A    6/1999

(Continued)

OTHER PUBLICATIONS

International Search Report in PCT/JP2022/021914, mailed Aug. 2, 2022, 3 pages.

*Primary Examiner* — Eric W Thomas
(74) *Attorney, Agent, or Firm* — ArentFox Schiff LLP

(57) ABSTRACT

A solid electrolytic capacitor element that includes: a valve acting metal substrate having a dielectric layer thereon; an insulating mask layer on the dielectric layer and separating the valve acting metal substrate into positive and negative electrode portions; a solid electrolyte layer on the dielectric layer, a tip of the solid electrolyte layer covering an outer surface of the insulating mask layer; a carbon layer on the solid electrolyte layer, a tip of the carbon layer covering a same position as the tip of the solid electrolyte layer or a position closer to the negative electrode portion; and a negative conductor layer on the carbon layer, a tip of the negative conductor layer covering a position closer to the negative electrode portion, and wherein the negative electrode portion has a negative conductor layer-non-formed region where the negative conductor layer does not cover a part of the carbon layer.

20 Claims, 11 Drawing Sheets

(56) References Cited

U.S. PATENT DOCUMENTS

2005/0162814 A1* 7/2005 Maruko ................ H01G 9/055
    361/504
2020/0082994 A1    3/2020  Fukui

FOREIGN PATENT DOCUMENTS

| JP | 2005045007 A | | 2/2005 |
|----|--------------|---|--------|
| JP | 2007-267107 A | | 10/2007 |
| JP | 2010177467 A | * | 8/2010 |
| JP | 2010267866 A | | 11/2010 |
| WO | 2018221096 A1 | | 12/2018 |

* cited by examiner

SOLID ELECTROLYTIC CAPACITOR ELEMENT HAVING A NEGATIVE CONDUCTOR LAYER THAT DOES NOT COVER A PART OF A CARBON LAYER, AND SOLID ELECTROLYTIC CAPACITOR

CROSS REFERENCE TO RELATED APPLICATIONS

The present application is a continuation of International application No. PCT/JP2022/021914, filed May 30, 2022, which claims priority to Japanese Patent Application No. 2021-099701, filed Jun. 15, 2021, the entire contents of each of which are incorporated herein by reference.

TECHNICAL FIELD

The present invention relates to a solid electrolytic capacitor element and a solid electrolytic capacitor.

BACKGROUND ART

JP 2010-267866 A (hereinafter "Patent Literature 1") discloses a solid electrolytic capacitor element in which a solid electrolyte layer containing a conductive polymer is provided on a dielectric oxide film formed on a valve action metal surface having micropores, the solid electrolytic capacitor element having a structure in which in a cross section of a capacitor element formed by overlapping a carbon paste layer and a highly conductive paste layer on a surface of the solid electrolyte layer, the solid electrolyte layer covers a part of an outer surface on a negative side of an insulator layer that separates a negative electrode and a positive electrode, and the highly conductive paste layer is formed on the surface up to a position spatially exceeding a boundary of a negative electrode portion of the insulator layer in a horizontal direction.

SUMMARY OF THE INVENTION

According to Patent Literature 1, (1) the solid electrolyte layer is configured to cover a part of the insulator layer formed on the outer surface of the valve action metal that separates the positive electrode and the negative electrode, and (2) the highly conductive paste is configured to be applied so as to spatially cross the boundary of the negative electrode portion of the insulator layer formed on the outer surface of the valve action metal that separates the positive electrode and the negative electrode, whereby an equivalent series resistance can be reduced without increasing a leakage current defect of a solid electrolytic capacitor.

Table 2 of Patent Literature 1 shows that the equivalent series resistance is reduced by forming a solid electrolyte layer on the outer surface on the negative electrode side of the insulator layer and further forming a carbon paste layer and a highly conductive paste layer thereon in Examples. However, Table 1 of Patent Literature 1 shows that there is no large difference in leakage current between Examples and Comparative Examples.

The present invention has been made to solve the above problems, and an object of the present invention is to provide a solid electrolytic capacitor element having a low equivalent series resistance and few leakage current defects. Furthermore, an object of the present invention is to provide a solid electrolytic capacitor including the solid electrolytic capacitor element.

A solid electrolytic capacitor element of the present invention includes: a valve acting metal substrate having a dielectric layer on at least one main surface thereof; an insulating mask layer on the dielectric layer and separating the valve acting metal substrate into a positive electrode portion and a negative electrode portion; a solid electrolyte layer on the dielectric layer in the negative electrode portion, wherein a tip of the solid electrolyte layer covers at least a part of an outer surface of the insulating mask layer; a carbon layer on the solid electrolyte layer, wherein a tip of the carbon layer covers a same position as the tip of the solid electrolyte layer or a position closer to the negative electrode portion relative to the tip of the solid electrolyte layer on the outer surface of the insulating mask layer; and a negative conductor layer on the carbon layer, wherein a tip of the negative conductor layer covers a position closer to the negative electrode portion relative to the tip of the carbon layer on the outer surface of the insulating mask layer. The negative electrode portion has a negative conductor layer-non-formed region where the negative conductor layer does not cover a part of the carbon layer.

A solid electrolytic capacitor of the present invention includes: the solid electrolytic capacitor element of the present invention; an exterior body sealing the solid electrolytic capacitor element; a first external electrode electrically connected to the valve acting metal substrate of the solid electrolytic capacitor element exposed from the exterior body; and a second external electrode electrically connected to the negative conductor layer of the solid electrolytic capacitor element exposed from the exterior body.

According to the present invention, it is possible to provide a solid electrolytic capacitor element having a low equivalent series resistance and few leakage current defects. Furthermore, according to the present invention, a solid electrolytic capacitor including the solid electrolytic capacitor element can be provided.

DETAILED DESCRIPTION OF THE PREFERRED EMBODIMENTS

Figure 1:
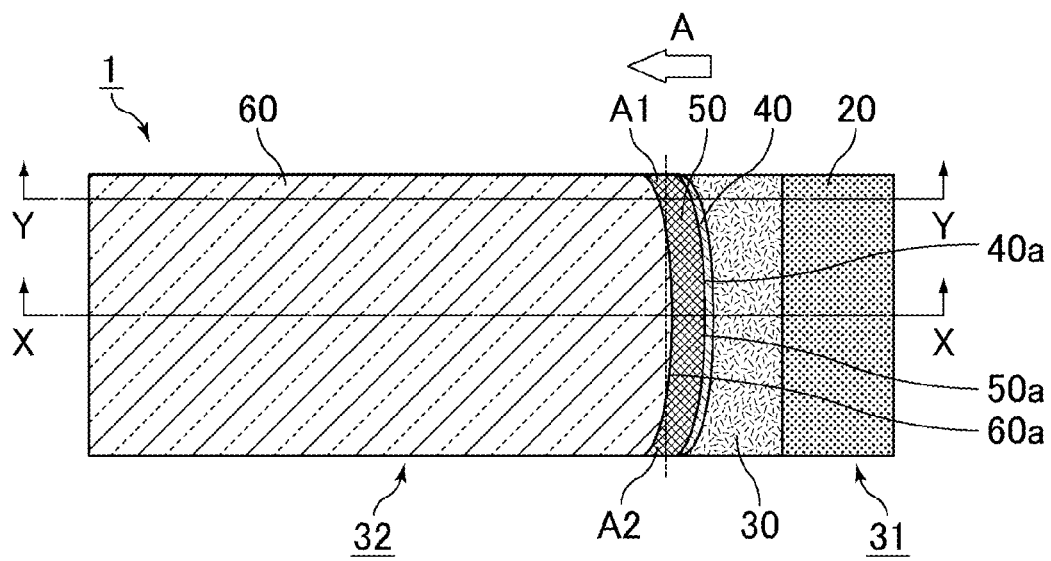
FIG. 1 is a plan view schematically showing an example of a solid electrolytic capacitor element according to Embodiment 1 of the present invention.

Hereinafter, a solid electrolytic capacitor element and a solid electrolytic capacitor of the present invention will be described.

However, the present invention is not limited to the following configurations, and can be appropriately modified and applied without changing the gist of the present invention. The present invention also includes a combination of two or more of individual desirable configurations described below.

[Solid Electrolytic Capacitor Element]

A solid electrolytic capacitor element of the present invention includes: a valve acting metal substrate having a dielectric layer on at least one main surface; an insulating mask layer on the dielectric layer and separating the valve acting metal substrate into a positive electrode portion and a negative electrode portion; a solid electrolyte layer on the dielectric layer in the negative electrode portion; a carbon layer on the solid electrolyte layer; and a negative conductor layer on the carbon layer.

In the solid electrolytic capacitor element of the present invention, the solid electrolyte layer is provided such that a tip of the solid electrolyte layer covers at least a part of an outer surface of the insulating mask layer, the carbon layer is provided such that a tip of the carbon layer covers the same position as the tip of the solid electrolyte layer or a position close to the negative electrode portion (arrow "A" side in FIGS. 1, 6, and 10) relative to the tip of the solid electrolyte layer on the outer surface of the insulating mask layer, and the negative conductor layer is provided such that a tip of the negative conductor layer covers a position close to the negative electrode portion relative to the tip of the carbon layer on the outer surface of the insulating mask layer. As a result, equivalent series resistance can be reduced.

In addition, in the solid electrolytic capacitor element of the present invention, the negative electrode portion has a negative conductor layer-non-formed region where the negative conductor layer does not cover a part of the carbon layer. Accordingly, a leakage current defect can be reduced.

For example, when the solid electrolyte layer is formed by an immersion method (dip method), the solid electrolyte layer hangs down downward from the vicinity of the insulating mask layer by its own weight, so that the thickness of the solid electrolyte layer in the vicinity of the insulating mask layer in the negative electrode portion is smaller than the thickness of the solid electrolyte layer in a central region of the negative electrode portion. As a result of examination by the present inventors, it has been found that when a negative conductor layer such as a silver layer is formed at a thin portion of the solid electrolyte layer, the negative conductor layer may pass through the solid electrolyte layer and come into contact with the dielectric layer, and may be conducted by a tunnel current to be short-circuited, or the leakage current may increase. Thus, the present inventors have considered that if the negative conductor layer is not formed at a thin portion of the solid electrolyte layer, the equivalent series resistance can be reduced and the leakage current defect can be reduced.

As described above, in the solid electrolytic capacitor element of the present invention, the solid electrolyte layer is provided so as to cover the negative electrode portion and cover at least a part of the outer surface of the insulating mask layer, the carbon layer is provided so as to cover the negative electrode portion and cover at least a part of the solid electrolyte layer on the outer surface of the insulating mask layer, the negative conductor layer is provided so as to cover the negative electrode portion and cover at least a part of the carbon layer on the outer surface of the insulating mask layer, and the negative conductor layer-non-formed region where the negative conductor layer does not cover a part of the carbon layer is present in the negative electrode portion, so that the equivalent series resistance can be low and the leakage current defect can be reduced.

It should be understood that embodiments described below are merely examples and configurations described in different embodiments can be partially combined, or replaced, with each other. In the second and subsequent embodiments, description of matters common to the first embodiment will be omitted, and only different points will be described. In particular, the same operation and effect of the same configuration will not be sequentially described for each embodiment.

Embodiment 1

In a solid electrolytic capacitor element according to Embodiment 1 of the present invention, an arc-shaped tip of a carbon layer is located close to a negative electrode portion relative to an arc-shaped tip of the solid electrolyte layer, and an arc-shaped tip of the negative conductor layer is located close to the negative electrode portion relative to the arc-shaped tip of the carbon layer. Hereinafter, unless otherwise specified, the arc-shaped tips of the solid electrolyte layer, the carbon layer, and the negative conductor layer are simply referred to as tips.

Figure 2:
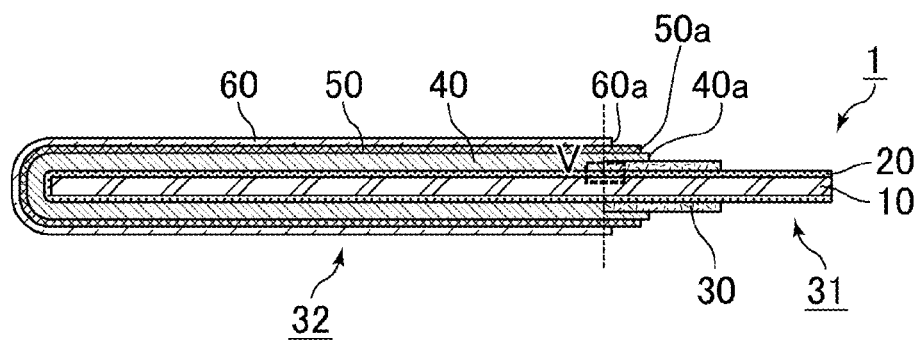
FIG. 2 is a cross-sectional view taken along line X-X of the solid electrolytic capacitor element shown in FIG. 1.
Figure 3:
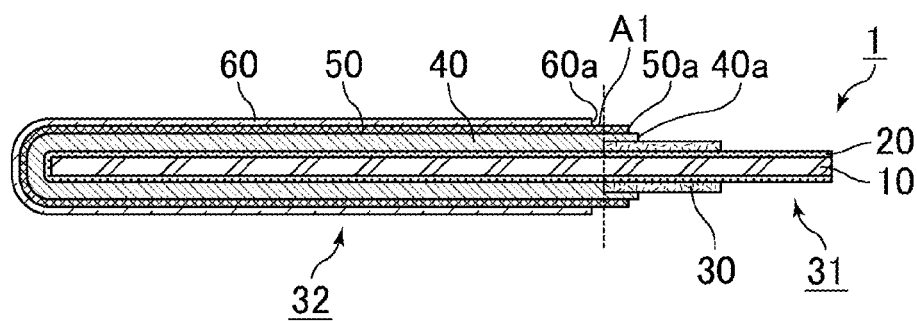
FIG. 3 is a cross-sectional view taken along line Y-Y of the solid electrolytic capacitor element shown in FIG. 1.

FIG. 1 is a plan view schematically showing an example of the solid electrolytic capacitor element according to Embodiment 1 of the present invention. FIG. 2 is a cross-sectional view taken along line X-X of the solid electrolytic capacitor element shown in FIG. 1. FIG. 3 is a cross-sectional view taken along line Y-Y of the solid electrolytic capacitor element shown in FIG. 1.

A solid electrolytic capacitor element 1 shown in FIGS. 1, 2, and 3 includes: a valve acting metal substrate 10 having a dielectric layer 20 on its surface; an insulating mask layer 30 provided on the dielectric layer 20; a solid electrolyte layer 40 provided on the dielectric layer 20; a carbon layer 50 provided on the solid electrolyte layer 40; and a negative conductor layer 60 provided on the carbon layer 50.

Figure 4A:
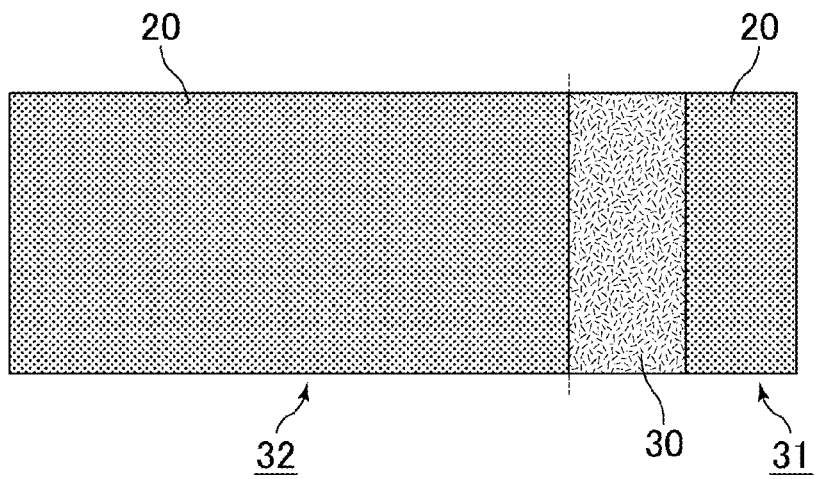
FIG. 4A is a plan view schematically showing an example of a dielectric layer and an insulating mask layer constituting the solid electrolytic capacitor element shown in FIG. 1.
Figure 4B:
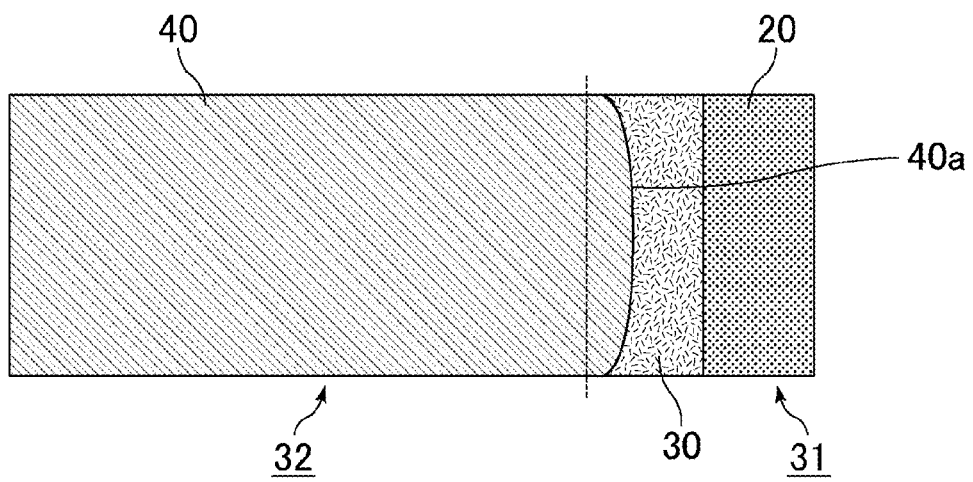
FIG. 4B is a plan view schematically showing an example of the dielectric layer, the insulating mask layer, and a solid electrolyte layer constituting the solid electrolytic capacitor element shown in FIG. 1.
Figure 4C:
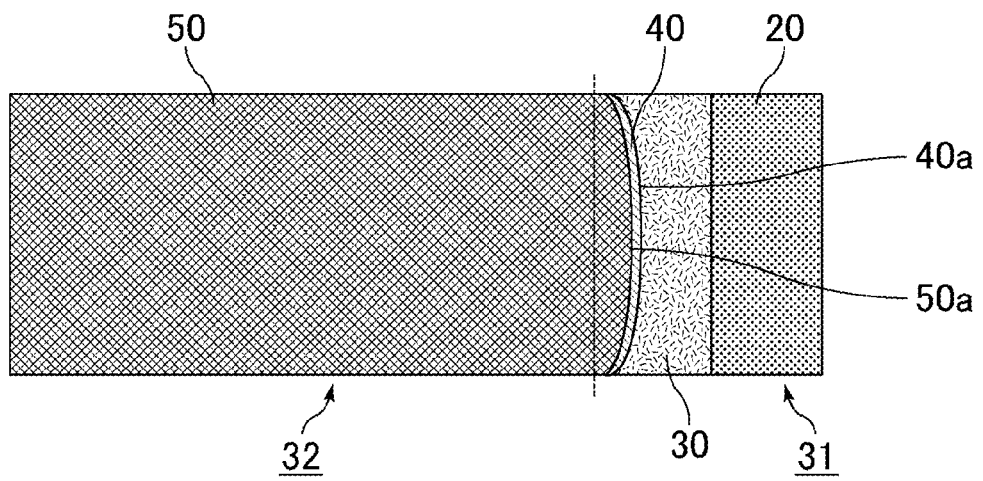
FIG. 4C is a plan view schematically showing an example of the dielectric layer, the insulating mask layer, the solid electrolyte layer, and a carbon layer constituting the solid electrolytic capacitor element shown in FIG. 1.

FIG. 4A is a plan view schematically showing an example of the dielectric layer and the insulating mask layer constituting the solid electrolytic capacitor element shown in FIG. 1. FIG. 4B is a plan view schematically showing an example of the dielectric layer, the insulating mask layer, and the solid electrolyte layer constituting the solid electrolytic capacitor element shown in FIG. 1. FIG. 4C is a plan view schematically showing an example of the dielectric layer, the insulating mask layer, the solid electrolyte layer, and the carbon layer constituting the solid electrolytic capacitor element shown in FIG. 1.

As shown in FIGS. 1, 2, 3, and 4A, the insulating mask layer 30 having a predetermined width is circumferentially provided on the dielectric layer 20. The insulating mask layer 30 is provided on both main surfaces and both side surfaces of the valve acting metal substrate 10 along a short side of the valve acting metal substrate 10. The valve acting metal substrate 10 is separated into the positive electrode portion 31 and the negative electrode portion 32 by the insulating mask layer 30.

As shown in FIGS. 1, 2, 3, and 4B, the solid electrolyte layer 40 is provided on the dielectric layer 20 in the negative electrode portion 32. The solid electrolyte layer 40 is provided such that a tip 40a covers an outer surface of the insulating mask layer 30. The solid electrolyte layer 40 may be provided so as to cover a part of the outer surface of the insulating mask layer 30, or may be provided so as to cover the entire outer surface of the insulating mask layer 30.

As shown in FIGS. 1, 2, 3, and 4C, the carbon layer 50 is provided such that a tip 50a covers a position closer to the negative electrode portion 32 relative to a tip 40a of the solid electrolyte layer 40 on the outer surface of the insulating mask layer 30.

As shown in FIGS. 1 and 2, the negative conductor layer 60 is provided such that a tip 60a covers a position closer to the negative electrode portion 32 relative to the tip 50a of the carbon layer 50 on the outer surface of the insulating mask layer 30.

On the other hand, as shown in FIGS. 1 and 3, negative conductor layer-non-formed regions A1 and A2 where the negative conductor layer 60 does not cover a part of the carbon layer 50 exist in the negative electrode portion 32.

As shown in FIG. 1, when viewed from a normal direction of the main surface of the valve acting metal substrate 10, the negative conductor layer 60 is preferably provided such that a middle portion of the tip 60a is located on the insulating mask layer 30 and opposed end portions of the tip 60a are located on the negative electrode portion 32. Furthermore, when viewed from the normal direction of the main surface of the valve acting metal substrate 10, the negative conductor layer 60 is preferably provided so as to approach the insulating mask layer 30 from the opposed end portions of the tip 60a toward the middle portion of the tip 60a.

The shape of the valve acting metal substrate 10 as viewed from the normal direction of the main surface of the valve acting metal substrate 10, that is, the shape of the valve acting metal substrate 10 in plan view from the thickness direction is a quadrangular shape, preferably a rectangular shape having long sides and short sides.

Figure 5:
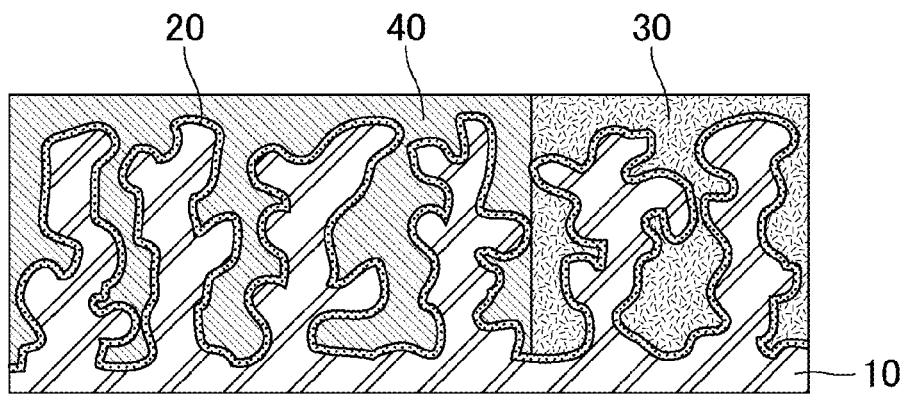
FIG. 5 is an enlarged cross-sectional view of a V portion of the solid electrolytic capacitor element shown in FIG. 2.

FIG. 5 is an enlarged cross-sectional view of a V portion of the solid electrolytic capacitor element shown in FIG. 2.

As shown in FIG. 5, a plurality of recesses are provided on the main surface of the valve acting metal substrate 10. Thus, the main surface of the valve acting metal substrate 10 is porous. Since the main surface of the valve acting metal substrate 10 is porous, a surface area of the valve acting metal substrate 10 increases. The present invention is not limited to a case where both the front surface and the back surface of the valve acting metal substrate 10 are porous, and only one of the front surface and the back surface of the valve acting metal substrate 10 may be porous.

The valve acting metal substrate 10 is made of, for example, a valve acting metal such as a single metal such as aluminum, tantalum, niobium, titanium, or zirconium, or an alloy containing at least one of these metals. An oxide film can be formed on the surface of the valve acting metal.

The valve acting metal substrate 10 only needs to include a core portion and a porous portion provided on at least one main surface of the core portion, and one obtained by etching the surface of the metal foil, one obtained by forming a porous fine powder sintered body on the surface of the metal foil, or the like can be appropriately adopted.

The dielectric layer 20 is provided on at least one main surface of the valve acting metal substrate 10. The dielectric layer 20 preferably includes an oxide film provided on the surface of the valve acting metal. For example, the dielectric layer 20 includes an oxide of aluminum. The aluminum oxide is formed by anodizing the surface of the valve acting metal substrate 10 as described later.

The insulating mask layer 30 is provided on the dielectric layer 20. As shown in FIG. 5, the insulating mask layer 30 is preferably provided so as to fill a plurality of pores (recesses) of the valve acting metal substrate 10. However, it is sufficient that a part of the outer surface of the dielectric layer 20 is covered with the insulating mask layer 30, and pores (recesses) of the valve acting metal substrate 10 not filled with the insulating mask layer 30 may be present.

The insulating mask layer 30 is formed, for example, by applying a mask material such as a composition containing an insulating resin. Examples of the insulating resin include polyphenylsulfone (PPS), polyethersulfone (PES), a cyanate ester resin, a fluororesin (tetrafluoroethylene, tetrafluoroethylene-perfluoroalkyl vinyl ether copolymer, etc.), a composition including a soluble polyimide siloxane and an epoxy resin, a polyimide resin, a polyamideimide resin, and derivatives or precursors thereof.

The mask material can be applied by, for example, a method such as screen printing, roller transfer, dispenser application, or inkjet printing.

The solid electrolyte layer 40 is provided on the dielectric layer 20. As shown in FIG. 5, the solid electrolyte layer 40 is preferably provided so as to fill a plurality of pores (recesses) of the valve acting metal substrate 10. However, it is sufficient that a part of the outer surface of the dielectric layer 20 is covered with the solid electrolyte layer 40, and pores (recesses) of the valve acting metal substrate 10 not filled with the solid electrolyte layer 40 may be present.

As a material constituting the solid electrolyte layer 40, for example, conductive polymers such as polypyrroles, polythiophenes, and polyanilines are used. Among them, polythiophenes are preferable, and poly (3,4-ethylenedioxythiophene) called PEDOT is particularly preferable. The conductive polymer may contain a dopant such as polystyrene sulfonates (PSS).

The solid electrolyte layer 40 is formed by, for example, a method of forming a polymerized film of a conductive polymer such as poly(3,4-ethylenedioxythiophene) on the surface of the dielectric layer 20 using a solution containing a polymerizable monomer such as 3,4-ethylenedioxythiophene, a method of applying a dispersion liquid of a conductive polymer such as poly(3,4-ethylenedioxythiophene) on the surface of the dielectric layer 20 and drying the dispersion liquid, or another method.

It is preferable to form an outer layer covering the entire dielectric layer 20 after forming an inner layer filling the pores (recesses) of the valve acting metal substrate 10. The inner layer can be formed by, for example, a method such as an immersion method, sponge transfer, screen printing, dispenser application, or inkjet printing. Similarly, the outer layer can be formed by, for example, a method such as an immersion method, sponge transfer, screen printing, dispenser application, or inkjet printing.

The carbon layer 50 is provided on the solid electrolyte layer 40. The carbon layer 50 is formed by, for example, a method in which a carbon paste is applied to the surface of the solid electrolyte layer 40 and dried.

The carbon paste can be applied by, for example, a method such as an immersion method, sponge transfer, screen printing, spray coating, dispenser application, or inkjet printing.

The negative conductor layer 60 is provided on the carbon layer 50. The negative conductor layer 60 is formed by, for example, a method in which a conductive paste containing a metal such as gold, silver, copper, or platinum is applied to the surface of the carbon layer 50 and dried. The negative conductor layer 60 is preferably a silver layer.

The conductive paste can be applied by, for example, a method such as an immersion method, sponge transfer, screen printing, spray coating, dispenser application, or inkjet printing.

Embodiment 2

In a solid electrolytic capacitor element according to Embodiment 2 of the present invention, a tip of a carbon layer is located at the same position as a tip of a solid electrolyte layer, and a tip of a negative conductor layer is located closer to the negative electrode portion relative to the tip of the carbon layer. However, an apex of the arc-shaped tip of the negative conductor layer is located at the same position as an apex of the arc-shaped tip of the carbon layer.

Figure 6:
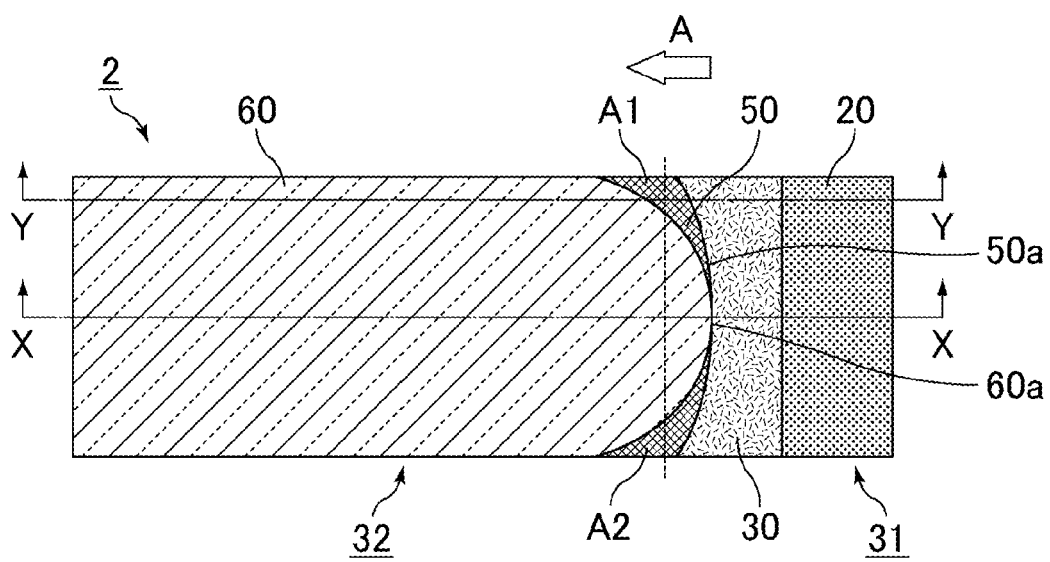
FIG. 6 is a plan view schematically showing an example of a solid electrolytic capacitor element according to Embodiment 2 of the present invention.
Figure 7:
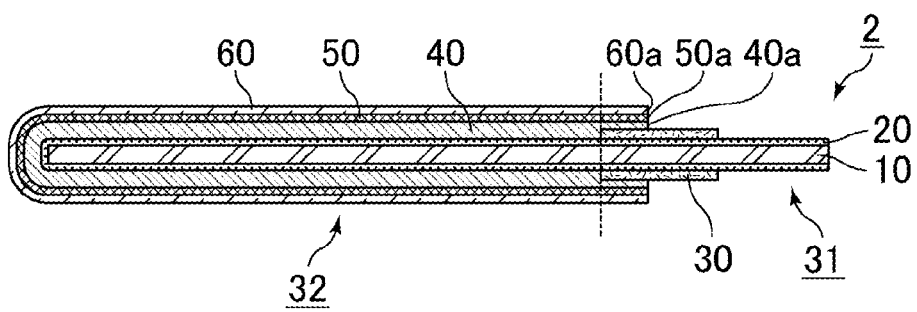
FIG. 7 is a cross-sectional view taken along line X-X of the solid electrolytic capacitor element shown in FIG. 6.
Figure 8:
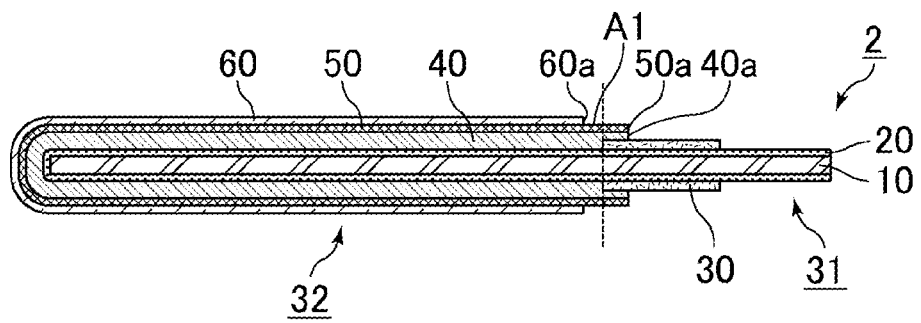
FIG. 8 is a cross-sectional view taken along line Y-Y of the solid electrolytic capacitor element shown in FIG. 6.

FIG. 6 is a plan view schematically showing an example of the solid electrolytic capacitor element according to Embodiment 2 of the present invention. FIG. 7 is a cross-sectional view taken along line X-X of the solid electrolytic capacitor element shown in FIG. 6. FIG. 8 is a cross-sectional view taken along line Y-Y of the solid electrolytic capacitor element shown in FIG. 6.

A solid electrolytic capacitor element 2 shown in FIGS. 6, 7, and 8 includes: a valve acting metal substrate 10 having a dielectric layer 20 on its surface; an insulating mask layer 30 provided on the dielectric layer 20; a solid electrolyte layer 40 provided on the dielectric layer 20; a carbon layer 50 provided on the solid electrolyte layer 40; and a negative conductor layer 60 provided on the carbon layer 50.

Figure 9A:
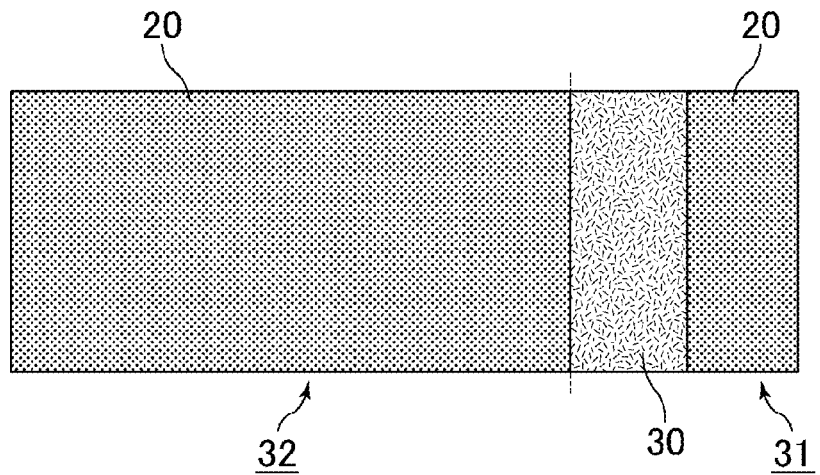
FIG. 9A is a plan view schematically showing an example of the dielectric layer and the insulating mask layer constituting the solid electrolytic capacitor element shown in FIG. 6.
Figure 9B:
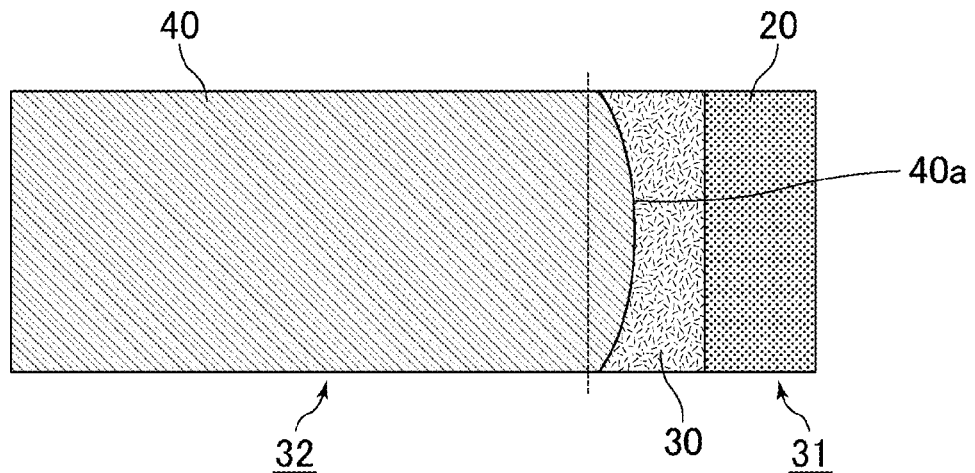
FIG. 9B is a plan view schematically showing an example of the dielectric layer, the insulating mask layer, and the solid electrolyte layer constituting the solid electrolytic capacitor element shown in FIG. 6.
Figure 9C:
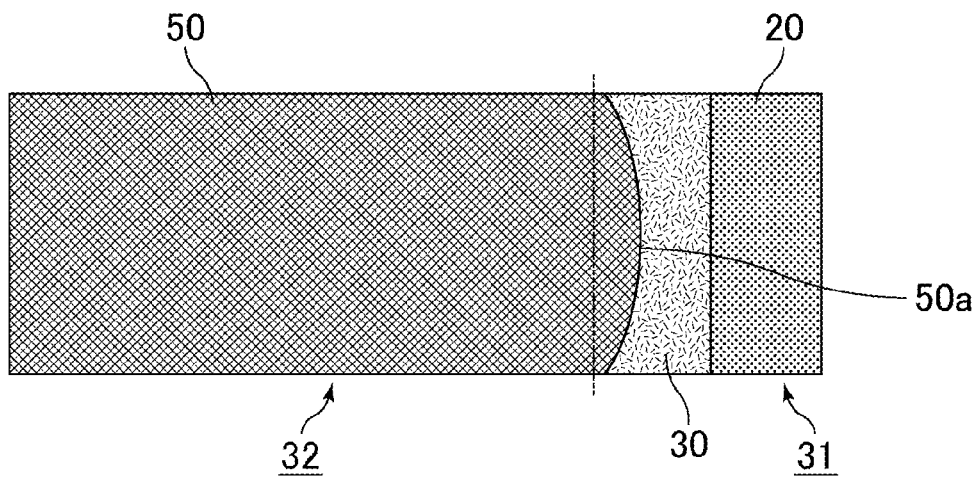
FIG. 9C is a plan view schematically showing an example of the dielectric layer, the insulating mask layer, the solid electrolyte layer, and the carbon layer constituting the solid electrolytic capacitor element shown in FIG. 6.

FIG. 9A is a plan view schematically showing an example of the dielectric layer and the insulating mask layer constituting the solid electrolytic capacitor element shown in FIG. 6. FIG. 9B is a plan view schematically showing an example of the dielectric layer, the insulating mask layer, and the solid electrolyte layer constituting the solid electrolytic capacitor element shown in FIG. 6. FIG. 9C is a plan view schematically showing an example of the dielectric layer, the insulating mask layer, the solid electrolyte layer, and the carbon layer constituting the solid electrolytic capacitor element shown in FIG. 6.

As shown in FIGS. 6, 7, 8, and 9A, the insulating mask layer 30 having a predetermined width is circumferentially provided on the dielectric layer 20. The insulating mask layer 30 is provided on both main surfaces and both side surfaces of the valve acting metal substrate 10 along a short side of the valve acting metal substrate 10. The valve acting metal substrate 10 is separated into the positive electrode portion 31 and the negative electrode portion 32 by the insulating mask layer 30.

As shown in FIGS. 6, 7, 8, and 9B, the solid electrolyte layer 40 is provided on the dielectric layer 20 in the negative electrode portion 32. The solid electrolyte layer 40 is provided such that a tip 40a covers an outer surface of the insulating mask layer 30. The solid electrolyte layer 40 may be provided so as to cover a part of the outer surface of the insulating mask layer 30, or may be provided so as to cover the entire outer surface of the insulating mask layer 30.

As shown in FIGS. 6, 7, 8, and 9C, the carbon layer 50 is provided such that a tip 50a covers the same position as the tip 40a of the solid electrolyte layer 40 on the outer surface of the insulating mask layer 30.

As shown in FIGS. 6 and 7, the negative conductor layer 60 is provided such that a tip 60a covers a position close to the negative electrode portion 32 relative to the tip 50a of the carbon layer 50 on the outer surface of the insulating mask layer 30. However, an apex of the tip 60a of the negative conductor layer 60 is located at the same position as an apex of the tip 50a of the carbon layer 50.

On the other hand, as shown in FIGS. 6 and 8, negative conductor layer-non-formed regions A1 and A2 where the negative conductor layer 60 does not cover a part of the carbon layer 50 exist in the negative electrode portion 32.

As shown in FIG. 6, when viewed from a normal direction of the main surface of the valve acting metal substrate 10, the negative conductor layer 60 is preferably provided such that a middle portion of the tip 60a is located on the insulating mask layer 30 and opposed end portions of the tip 60a are located on the negative electrode portion 32. Furthermore, when viewed from the normal direction of the main surface of the valve acting metal substrate 10, the negative conductor layer 60 is preferably provided so as to approach the insulating mask layer 30 from the opposed end portions of the tip 60a toward the middle portion of the tip 60a.

Embodiment 3

In a solid electrolytic capacitor element according to Embodiment 3 of the present invention, a tip of a carbon layer is located closer to the negative electrode portion relative to a tip of a solid electrolyte layer, and a tip of a negative conductor layer is located closer to the negative electrode portion relative to the tip of the carbon layer. However, an apex of the arc-shaped tip of the negative conductor layer is located at the same position as an apex of the arc-shaped tip of the carbon layer.

Figure 10:
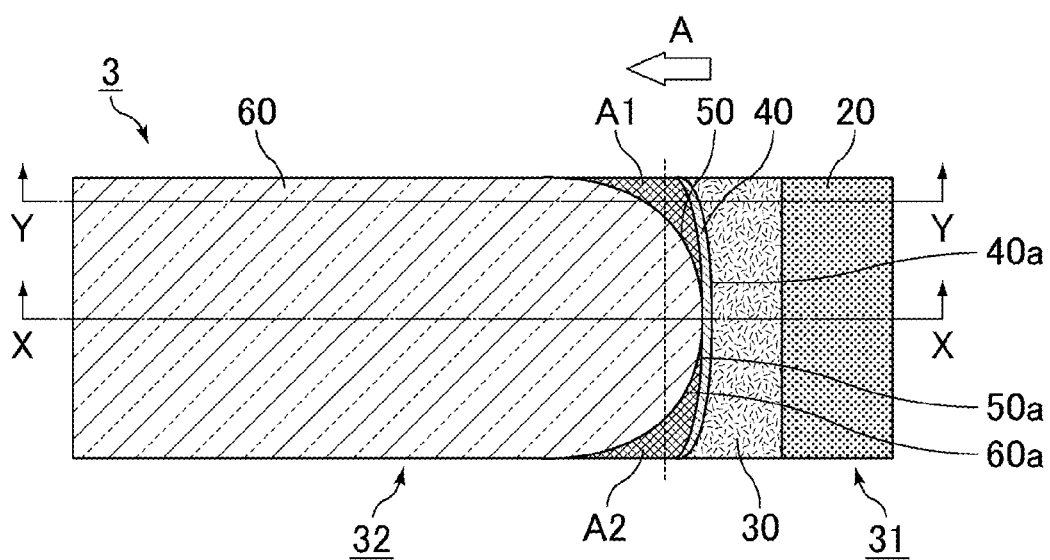
FIG. 10 is a plan view schematically showing an example of a solid electrolytic capacitor element according to Embodiment 3 of the present invention.
Figure 11:
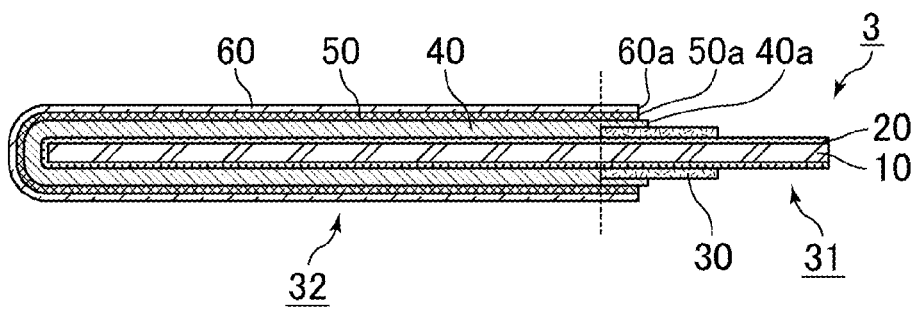
FIG. 11 is a cross-sectional view taken along line X-X of the solid electrolytic capacitor element shown in FIG. 10.
Figure 12:
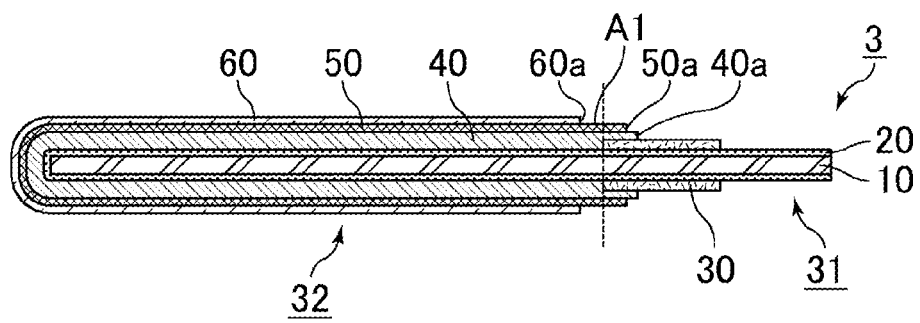
FIG. 12 is a cross-sectional view taken along line Y-Y of the solid electrolytic capacitor element shown in FIG. 10.

FIG. 10 is a plan view schematically showing an example of the solid electrolytic capacitor element according to Embodiment 3 of the present invention. FIG. 11 is a cross-sectional view taken along line X-X of the solid electrolytic capacitor element shown in FIG. 10. FIG. 12 is a cross-sectional view taken along line Y-Y of the solid electrolytic capacitor element shown in FIG. 10.

A solid electrolytic capacitor element 3 shown in FIGS. 10, 11, and 12 includes: a valve acting metal substrate 10 having a dielectric layer 20 on its surface; an insulating mask layer 30 provided on the dielectric layer 20; a solid electrolyte layer 40 provided on the dielectric layer 20; a carbon layer 50 provided on the solid electrolyte layer 40; and a negative conductor layer 60 provided on the carbon layer 50.

Figure 13A:
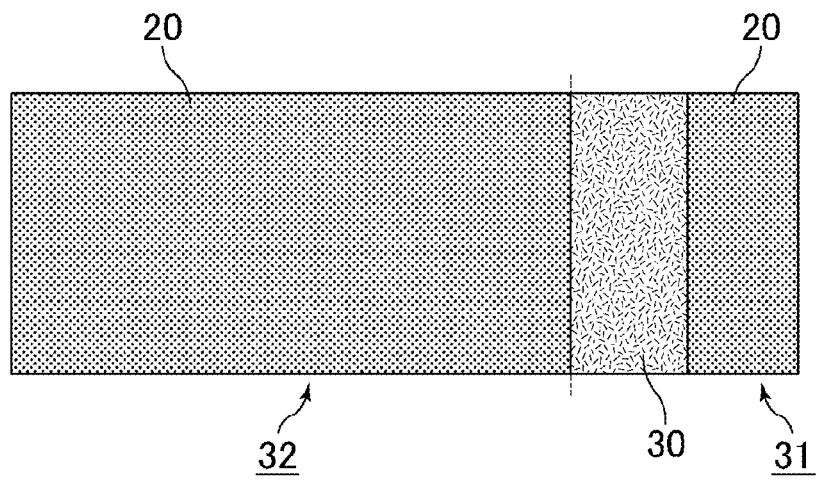
FIG. 13A is a plan view schematically showing an example of the dielectric layer and the insulating mask layer constituting the solid electrolytic capacitor element shown in FIG. 10.
Figure 13B:
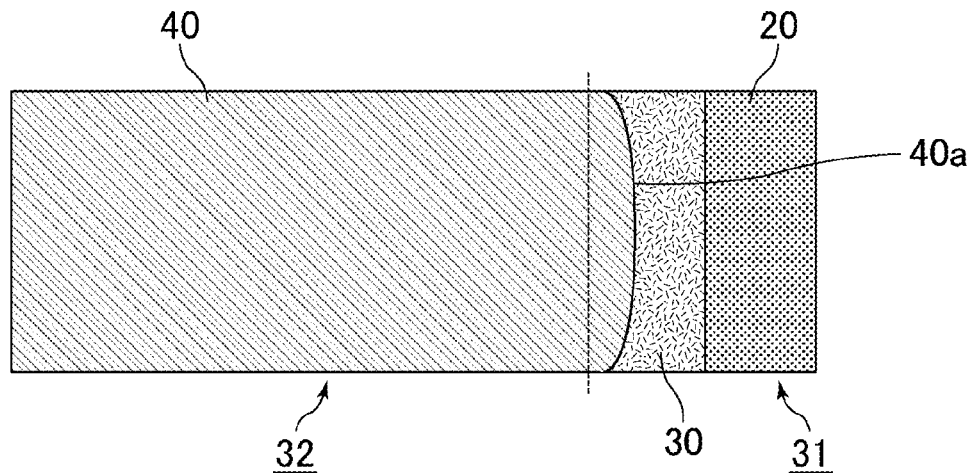
FIG. 13B is a plan view schematically showing an example of the dielectric layer, the insulating mask layer, and the solid electrolyte layer constituting the solid electrolytic capacitor element shown in FIG. 10.
Figure 13C:
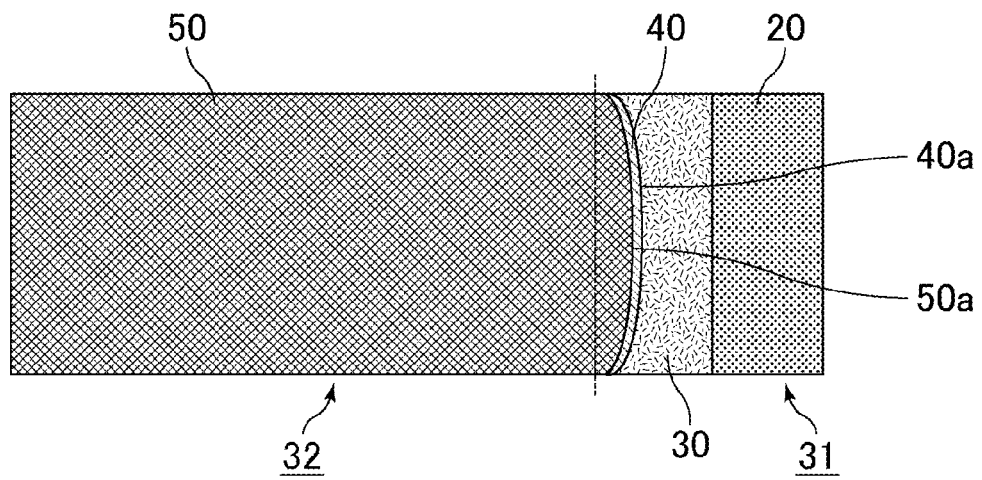
FIG. 13C is a plan view schematically showing an example of the dielectric layer, the insulating mask layer, the solid electrolyte layer, and the carbon layer constituting the solid electrolytic capacitor element shown in FIG. 10.

FIG. 13A is a plan view schematically showing an example of the dielectric layer and the insulating mask layer constituting the solid electrolytic capacitor element shown in FIG. 10. FIG. 13B is a plan view schematically showing an example of the dielectric layer, the insulating mask layer, and the solid electrolyte layer constituting the solid electrolytic capacitor element shown in FIG. 10. FIG. 13C is a plan view schematically showing an example of the dielectric layer, the insulating mask layer, the solid electrolyte layer, and the carbon layer constituting the solid electrolytic capacitor element shown in FIG. 10.

As shown in FIGS. 10, 11, 12, and 13A, the insulating mask layer 30 having a predetermined width is circumferentially provided on the dielectric layer 20. The insulating mask layer 30 is provided on both main surfaces and both side surfaces of the valve acting metal substrate 10 along a short side of the valve acting metal substrate 10. The valve acting metal substrate 10 is separated into the positive electrode portion 31 and the negative electrode portion 32 by the insulating mask layer 30.

As shown in FIGS. 10, 11, 12, and 13B, the solid electrolyte layer 40 is provided on the dielectric layer 20 in the negative electrode portion 32. The solid electrolyte layer 40 is provided such that a tip 40a covers an outer surface of the insulating mask layer 30. The solid electrolyte layer 40 may be provided so as to cover a part of the outer surface of the insulating mask layer 30, or may be provided so as to cover the entire outer surface of the insulating mask layer 30.

As shown in FIGS. 10, 11, 12, and 13C, the carbon layer 50 is provided such that a tip 50a covers a position close to the negative electrode portion 32 relative to the tip 40a of the solid electrolyte layer 40 on the outer surface of the insulating mask layer 30.

As shown in FIGS. 10 and 11, the negative conductor layer 60 is provided such that a tip 60a covers a position close to the negative electrode portion 32 relative to the tip 50a of the carbon layer 50 on the outer surface of the insulating mask layer 30. However, an apex of the tip 60a of the negative conductor layer 60 is located at the same position as an apex of the tip 50a of the carbon layer 50.

On the other hand, as shown in FIGS. 10 and 12, negative conductor layer-non-formed regions A1 and A2 where the negative conductor layer 60 does not cover a part of the carbon layer 50 exist in the negative electrode portion 32.

As shown in FIG. 10, when viewed from a normal direction of the main surface of the valve acting metal substrate 10, the negative conductor layer 60 is preferably provided such that a middle portion of the tip 60a is located on the insulating mask layer 30 and opposed end portions of the tip 60a are located on the negative electrode portion 32. Furthermore, when viewed from the normal direction of the main surface of the valve acting metal substrate 10, the negative conductor layer 60 is preferably provided so as to approach the insulating mask layer 30 from the opposed end portions of the tip 60a toward the middle portion of the tip 60a.

As in Embodiments 1 to 3, the arc-shaped tip of the carbon layer may be located close to the negative electrode portion relative to the arc-shaped tip of the solid electrolyte layer, and the arc-shaped tip of the negative conductor layer may be located close to the negative electrode portion relative to the arc-shaped tip of the carbon layer. Alternatively, the arc-shaped tip of the carbon layer may be located at the same position as the arc-shaped tip of the solid electrolyte layer, and the arc-shaped tip of the negative conductor layer may be located close to the negative electrode portion relative to the arc-shaped tip of the carbon layer.

The solid electrolytic capacitor element of the present invention is manufactured, for example, by the following method. In the following example, a method of simultaneously manufacturing a plurality of solid electrolytic capacitor elements using a large-sized valve acting metal substrate will be described.

Figure 14:
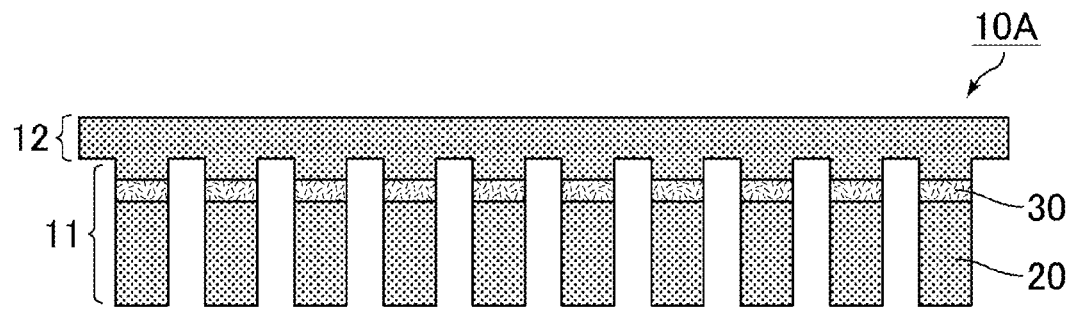
FIG. 14 is a schematic view showing an example of a step of preparing a valve acting metal substrate including the insulating mask layer.

FIG. 14 is a schematic view showing an example of a step of preparing the valve acting metal substrate including the insulating mask layer.

As shown in FIG. 14, a valve acting metal substrate 10A having the dielectric layer 20 on its surface is prepared. The valve acting metal substrate 10A includes a plurality of element portions 11 and a support portion 12. Each of the element portions 11 has a strip shape and protrudes from the support portion 12. In addition, the insulating mask layer 30 is formed on the dielectric layer 20 of each of the element portions 11.

First, the valve acting metal substrate 10A having a porous portion on its surface is cut by laser processing, punching, or another processing to be processed into a shape including the plurality of element portions 11 and the support portion 12.

Next, the insulating mask layers 30 are formed on both main surfaces and both side surfaces of the element portion 11 along the short side of each of the element portions 11.

Thereafter, the valve acting metal substrate 10A is anodized to form an oxide film to be the dielectric layer 20 on the surface of the valve acting metal substrate 10A. At this time, an oxide film is also formed on the side surface of the element portion 11 cut by laser processing, punching, or another processing. Incidentally, a chemical conversion foil on which an oxide of aluminum is already formed may be used as the valve acting metal substrate 10A. Also in this case, the valve acting metal substrate 10A after cutting is anodized to form an oxide film on the side surface of the cut element portion 11.

Figure 15:
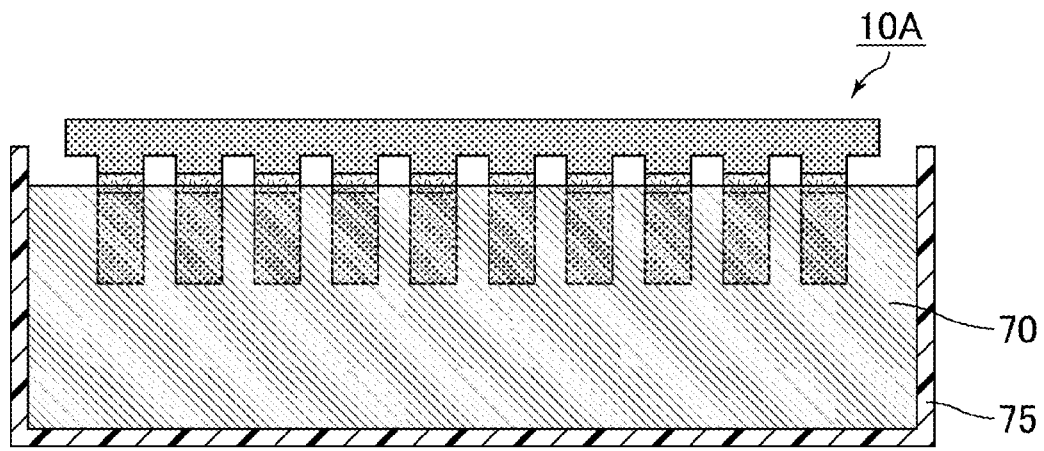
FIG. 15 is a schematic view showing an example of a step of forming the solid electrolyte layer.

FIG. 15 is a schematic view showing an example of a step of forming the solid electrolyte layer.

The solid electrolyte layer 40 (see FIG. 4B and the like) is formed on the dielectric layer 20 of the element portion 11. As shown in FIG. 15, it is preferable to apply a treatment liquid containing a solid electrolyte to the valve acting metal substrate 10A by an immersion method. FIG. 15 shows a state in which a treatment liquid 70 containing a solid electrolyte is supplied to a treatment tank 75.

As the treatment liquid 70 containing a solid electrolyte, for example, a dispersion liquid of a conductive polymer is used. A conductive polymer film can be formed by attaching the dispersion liquid of the conductive polymer to the outer surface of the dielectric layer 20 and drying the dispersion liquid. Alternatively, as the treatment liquid 70 containing the solid electrolyte, a solution containing a polymerizable monomer, for example, 3,4-ethylenedioxythiophene and an oxidizing agent may be used. A conductive polymer film can be formed by chemical polymerization after attaching a liquid containing a polymerizable monomer to the outer surface of the dielectric layer 20. This conductive polymer film becomes the solid electrolyte layer 40.

As shown in FIG. 15, the porous portion of the valve acting metal substrate 10A is impregnated with the treatment liquid 70 by immersing the valve acting metal substrate 10A in the treatment liquid 70. After immersion for a predetermined time, the valve acting metal substrate 10A is pulled up from the treatment liquid 70 and dried at a predetermined temperature for a predetermined time. The solid electrolyte layer 40 is formed by repeating immersion in the treatment liquid 70, pulling up, and drying a predetermined number of times.

For example, a first solid electrolyte layer is formed by immersing, pulling up, and drying the valve acting metal substrate 10A in a first dispersion liquid containing the conductive polymer. Immersion in the first dispersion liquid, pulling up, and drying are performed a plurality of times.

After the first solid electrolyte layer is formed, a primer layer may be formed by immersing, pulling up, and drying the valve acting metal substrate 10A in a solution containing a primer compound.

Thereafter, a second solid electrolyte layer is formed by immersing, pulling up, and drying the valve acting metal substrate 10A in a second dispersion liquid containing the conductive polymer. At this time, the concentration of the conductive polymer in the second dispersion liquid is preferably higher than the concentration of the conductive polymer in the first dispersion liquid.

The solid electrolyte layer formed by the above method includes the first solid electrolyte layer provided on the dielectric layer and the second solid electrolyte layer provided on the first solid electrolyte layer, and the content of the conductive polymer in the second solid electrolyte layer is larger than the content of the conductive polymer in the first solid electrolyte layer.

The valve acting metal substrate 10A is washed with pure water to remove an excessive primer compound. After washing, a drying treatment is performed. As described above, the solid electrolyte layer 40 is formed in a predetermined region.

Figure 16:
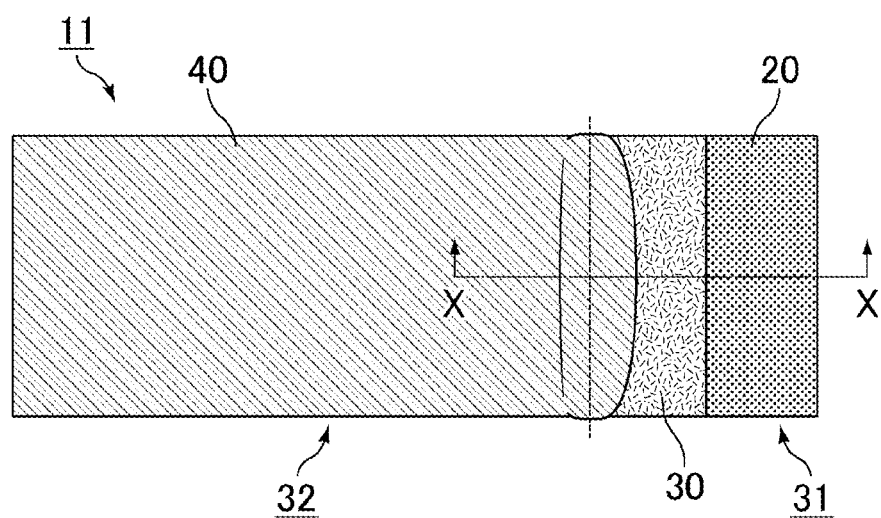
FIG. 16 is a plan view schematically showing an example of an element portion after the solid electrolyte layer is formed.
Figure 17:
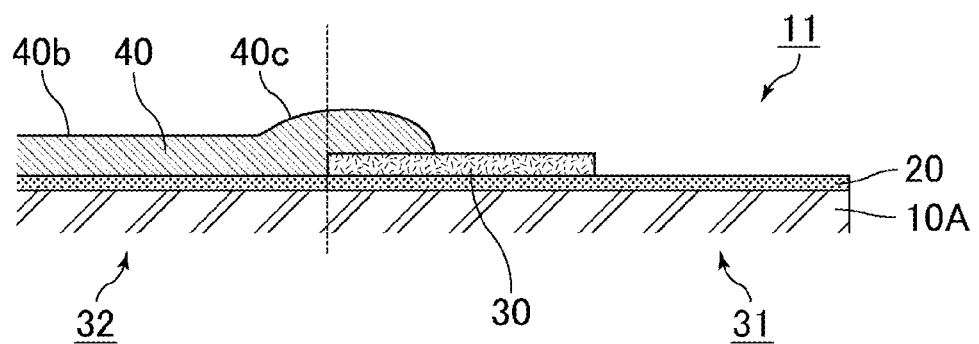
FIG. 17 is a cross-sectional view taken along line X-X of an element portion shown in FIG. 16.

FIG. 16 is a plan view schematically showing an example of the element portion after the solid electrolyte layer is formed. FIG. 17 is a cross-sectional view taken along line X-X of the element portion shown in FIG. 16.

As shown in FIGS. 16 and 17, the thickness of a solid electrolyte layer 40c provided in the region of the negative electrode portion 32 in contact with the insulating mask layer 30 is preferably larger than the thickness of a solid electrolyte layer 40b provided in a central region of the negative electrode portion 32.

As described above, when the thickness of the solid electrolyte layer 40c in the vicinity of the insulating mask layer 30 in the negative electrode portion 32 is smaller than the thickness of the solid electrolyte layer 40b in the central region of the negative electrode portion 32, there is a possibility that conduction occurs due to a tunnel current and a short circuit occurs, or a leakage current increases. On the other hand, as shown in FIGS. 16 and 17, by making the thickness of the solid electrolyte layer 40c in the vicinity of the insulating mask layer 30 in the negative electrode portion 32 larger than the thickness of the solid electrolyte layer 40b in the central region of the negative electrode portion 32, a short circuit is less likely to occur, and a leakage current defect can be reduced.

After the solid electrolyte layer 40 is formed, the valve acting metal substrate 10A is immersed in the carbon paste, pulled up, and dried to form the carbon layer 50 (see FIG. 4C and the like) in a predetermined region.

After the carbon layer 50 is formed, the valve acting metal substrate 10A is immersed in a conductive paste such as a silver paste, pulled up, and dried to form the negative conductor layer 60 (see FIG. 1 and the like) in a predetermined region.

The element portion 11 is separated by cutting the valve acting metal substrate 10A.

A solid electrolytic capacitor element is obtained through the above steps.

[Solid Electrolytic Capacitor]

Hereinafter, an example of a solid electrolytic capacitor including the solid electrolytic capacitor element of the present invention will be described. The solid electrolytic capacitor element of the present invention may be included in a solid electrolytic capacitor having another configuration. For example, a lead frame may be used as an external electrode. The solid electrolytic capacitor of the present invention may include a solid electrolytic capacitor element other than the solid electrolytic capacitor element of the present invention.

Figure 18:
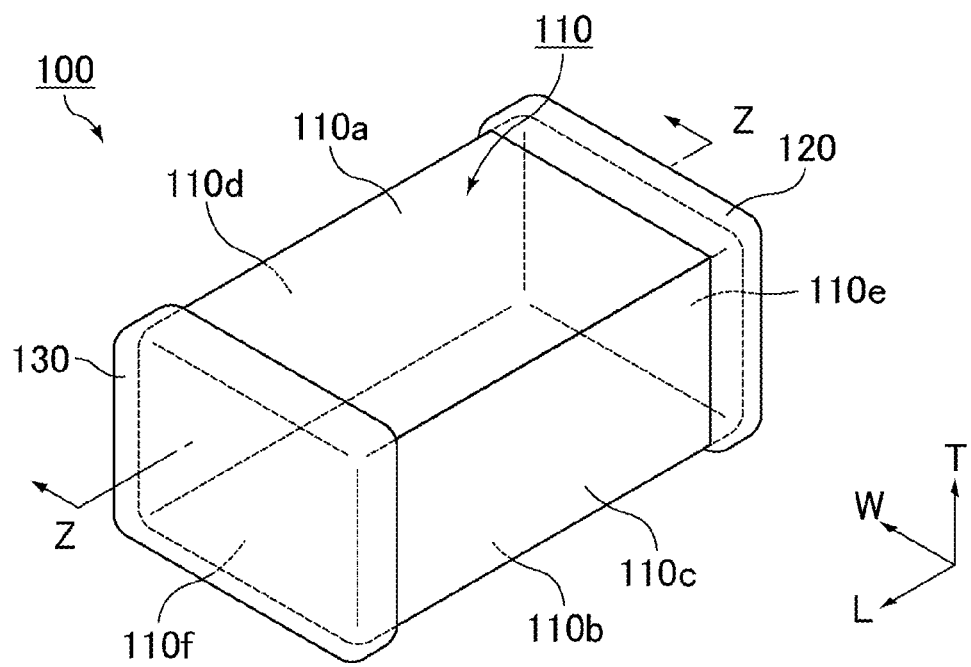
FIG. 18 is a perspective view schematically showing an example of the solid electrolytic capacitor of the present invention.
Figure 19:
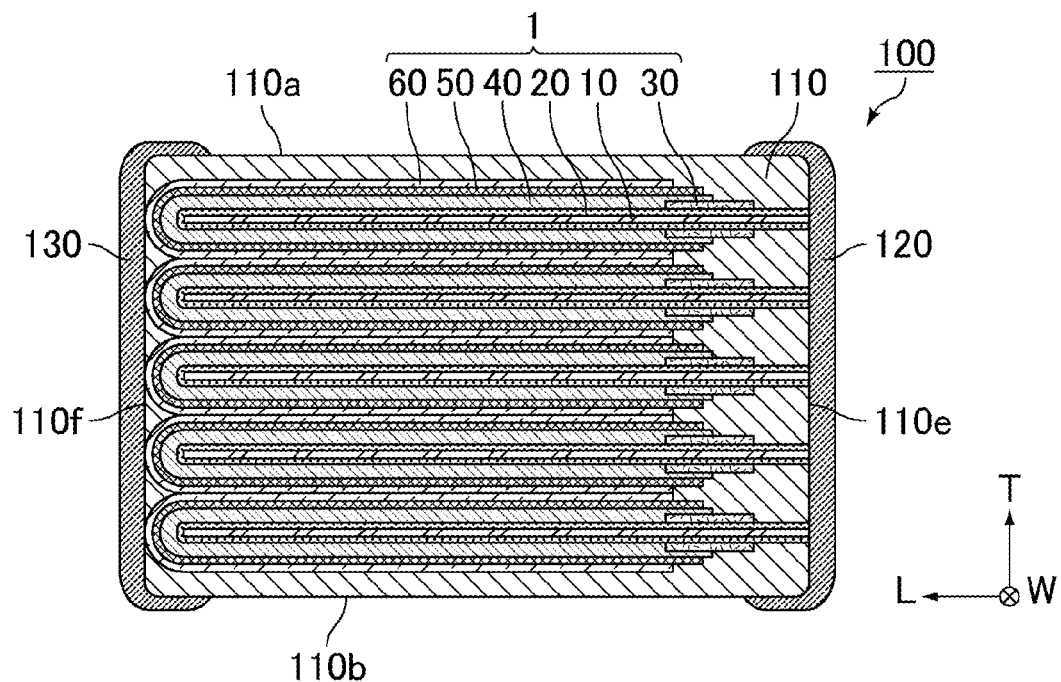
FIG. 19 is a cross-sectional view taken along line Z-Z of the solid electrolytic capacitor shown in FIG. 18.

FIG. 18 is a perspective view schematically showing an example of the solid electrolytic capacitor of the present invention. FIG. 19 is a cross-sectional view taken along line Z-Z of the solid electrolytic capacitor shown in FIG. 18.

In FIGS. 18 and 19, the length direction, the width direction, and the height direction of the solid electrolytic capacitor 100 and an exterior body 110 are indicated by L, W, and T, respectively. Here, the length direction L, the width direction W, and the height direction T are orthogonal to each other.

As shown in FIGS. 18 and 19, the solid electrolytic capacitor 100 has a substantially rectangular parallelepiped outer shape. The solid electrolytic capacitor 100 includes the exterior body 110, a first external electrode 120, a second external electrode 130, and a plurality of solid electrolytic capacitor elements 1. The solid electrolytic capacitor element 1 is an example of the solid electrolytic capacitor element of the present invention.

The exterior body 110 seals the plurality of solid electrolytic capacitor elements 1. That is, the plurality of solid electrolytic capacitor elements 1 are embedded in the exterior body 110. The exterior body 110 may seal one solid electrolytic capacitor element 1. That is, one solid electrolytic capacitor element 1 may be embedded in the exterior body 110.

The exterior body 110 has a substantially rectangular parallelepiped outer shape. The exterior body 110 has a first main surface 110a and a second main surface 110b facing each other in the height direction T, a first side surface 110c and a second side surface 110d facing each other in the width direction W, and a first end surface 110e and a second end surface 110f facing each other in the length direction L.

As described above, although the exterior body 110 has a substantially rectangular parallelepiped outer shape, it is preferable that corner portions and ridge portions are rounded. The corner portion is a portion where three surfaces of the exterior body 110 intersect each other, and the ridge portion is a portion where two surfaces of the exterior body 110 intersect each other.

The exterior body 110 is made of, for example, a sealing resin.

The sealing resin contains at least a resin, and preferably contains a resin and a filler.

As the resin, an epoxy resin, a phenol resin, a polyimide resin, a silicone resin, a polyamide resin, a liquid crystal polymer and the like are preferably used.

As the filler, silica particles, alumina particles, metal particles, and the like are preferably used.

As the sealing resin, a material containing a solid epoxy resin, a phenol resin, and silica particles is preferably used.

When a solid sealing resin is used, a resin mold such as a compression mold or a transfer mold is preferably used, and a compression mold is more preferably used. When a liquid sealing resin is used, a molding method such as a dispensing method or a printing method is preferably used. In particular, it is preferable to seal the periphery of the solid electrolytic capacitor element 1 with a sealing resin by compression molding to form the exterior body 110.

The exterior body 110 may include a substrate and a sealing resin provided on the substrate. The substrate is, for example, an insulating resin substrate such as a glass epoxy substrate. In this case, a bottom surface of the substrate constitutes the second main surface 110b of the exterior body 110. The thickness of the substrate is, for example, 100 μm.

The plurality of solid electrolytic capacitor elements 1 are stacked in the height direction T. An extending direction of each of the plurality of solid electrolytic capacitor elements 1 is substantially parallel to the first main surface 110a and the second main surface 110b of the exterior body 110. The solid electrolytic capacitor elements 1 may be bonded to each other with a conductive adhesive interposed therebetween.

The first external electrode 120 is provided on the first end surface 110e of the exterior body 110. In FIG. 18, the first external electrode 120 is provided from the first end surface 110e of the exterior body 110 to each of the first main surface 110a, the second main surface 110b, the first side surface 110c, and the second side surface 110d. The first external electrode 120 is electrically connected to the valve acting metal substrate 10 of the solid electrolytic capacitor element 1 exposed from the exterior body 110. The first external electrode 120 may be directly or indirectly connected to the valve acting metal substrate 10 on the first end surface 110e of the exterior body 110.

The second external electrode 130 is provided on the second end surface 110f of the exterior body 110. In FIG. 18, the second external electrode 130 is provided from the second end surface 110f of the exterior body 110 to each of the first main surface 110a, the second main surface 110b, the first side surface 110c, and the second side surface 110d. The second external electrode 130 is electrically connected to the negative conductor layer 60 of the solid electrolytic capacitor element 1 exposed from the exterior body 110. The second external electrode 130 may be directly or indirectly connected to the negative conductor layer 60 on the second end surface 110f of the exterior body 110.

Each of the first external electrode 120 and the second external electrode 130 is preferably formed by at least one method selected from the group consisting of a dip coating method, a screen printing method, a transfer method, an inkjet printing method, a dispensing method, a spray coating method, a brush coating method, a drop casting method, an electrostatic coating method, a plating method, and a sputtering method.

The first external electrode 120 preferably has a resin electrode layer containing a conductive component and a resin component. When the first external electrode 120 contains a resin component, adhesion between the first external electrode 120 and the sealing resin of the exterior body 110 is enhanced, so that reliability is improved.

The second external electrode 130 preferably has a resin electrode layer containing a conductive component and a resin component. When the second external electrode 130 contains a resin component, adhesion between the second external electrode 130 and the sealing resin of the exterior body 110 is enhanced, so that the reliability is improved.

The conductive component preferably contains, as a main component, a simple metal such as silver, copper, nickel, or tin, an alloy containing at least one of these metals, or the like.

The resin component preferably contains an epoxy resin, a phenol resin, or the like as a main component.

The resin electrode layer is formed by, for example, a method such as a dip coating method, a screen printing method, a transfer method, an inkjet printing method, a dispensing method, a spray coating method, a brush coating method, a drop casting method, or an electrostatic coating method. Among them, the resin electrode layer is preferably a printed resin electrode layer formed by applying a conductive paste by a screen printing method. When the resin electrode layer is formed by applying a conductive paste by a screen printing method, the first external electrode 120 and the second external electrode 130 tend to be flat as compared with the case where the resin electrode layer is formed by applying the conductive paste by a dip coating method. That is, the thicknesses of the first external electrode 120 and the second external electrode 130 tend to be uniform.

When the second external electrode 130 has a resin electrode layer, the second external electrode 130, the carbon layer 50, and the negative conductor layer 60 contain a resin component, thereby improving the adhesion between the second external electrode 130 and the carbon layer 50 and the adhesion between the second external electrode 130 and the negative conductor layer 60, and thus improving the reliability.

At least one of the first external electrode 120 or the second external electrode 130 may have a so-called plating layer formed by a plating method. Examples of the plating layer include a zinc-silver-nickel layer, a silver-nickel layer, a nickel layer, a zinc-nickel-gold layer, a nickel-gold layer, a zinc-nickel-copper layer, and a nickel-copper layer. For example, a copper plating layer, a nickel plating layer, and a tin plating layer are preferably provided in this order (alternatively, except for some plating layers) on these plating layers.

At least one of the first external electrode 120 or the second external electrode 130 may have both a resin electrode layer and a plating layer. For example, the first external electrode 120 may have a resin electrode layer connected to the valve acting metal substrate 10 and an outer layer plating layer provided on the surface of the resin electrode layer. In addition, the first external electrode 120 may include an inner layer plating layer connected to the valve acting metal substrate 10, a resin electrode layer provided so as to cover the inner layer plating layer, and an outer layer plating layer provided on the surface of the resin electrode layer.

EXAMPLES

Hereinafter, examples more specifically disclosing the solid electrolytic capacitor element of the present invention will be described. The present invention is not limited only to these Examples.

Preparation of Solid Electrolytic Capacitor Element

EXAMPLES

As Examples 1 to 10, a total of ten solid electrolytic capacitor elements 1 shown in FIGS. 1, 2, and 3 were prepared. The preparation method is shown below.
  (1) As shown in FIG. 14, the strip-shaped valve acting metal substrate 10A having the plurality of element portions 11 is formed by laser processing or punching. The valve acting metal substrate 10A has a porous portion etched with hydrochloric acid or the like.
  (2) The insulating mask layers 30 are formed on both main surfaces and both side surfaces of the element portion 11 along the short side of the element portion 11. The insulating mask layer 30 is formed such that a dimension of a capacitance portion in one element portion 11 is a predetermined dimension between a dimension in the length direction L of 4.5 mm or more and 7.0 mm or less and a dimension in the width direction W of 3.0 mm or more and 4.0 mm or less. The dimension of the insulating mask layer 30 is formed so that the length along the length direction L of the capacitance portion is 0.5 mm or more and 2 mm or less.
  (3) The valve acting metal substrate 10A is anodized to form an oxide film to be the dielectric layer 20 on the element portion 11. An oxide film is also formed on a side surface of the element portion 11 subjected to laser processing or punching. The valve acting metal substrate 10A is anodized in an aqueous solution containing boric acid, phosphoric acid, adipic acid, or a sodium salt or ammonium salt thereof to form an oxide film.
  (4) The valve acting metal substrate 10A is immersed in a dispersion liquid containing a conductive polymer constituting the first solid electrolyte layer to be impregnated with the dispersion liquid, thereby forming the first solid electrolyte layer in the region shown in FIG. 4B. After immersion, a drying treatment is performed. (4) is performed a plurality of times. By optimizing a lowering rate (immersion rate) under the immersion condition, an impregnation property of the dispersion liquid into the porous portion is improved, and as a result, the electrostatic capacity described later is improved.
  (5) The valve acting metal substrate 10A is impregnated with a solution containing a primer compound (see JP 6449914 B. A bifunctional or polyfunctional monomer compound containing at least one amine group and at least one carboxylic acid group or sulfonic acid group) to form a primer layer in a region shown in FIG. 4B. After immersion, a drying treatment is performed.

In the drying treatment, when the strip-shaped valve acting metal substrate 10A is dried in a state of being inverted by 180 degrees during drying, the solution containing the primer compound tends to accumulate in the vicinity of the insulating mask layer 30, so that an adhesion amount of the primer compound after drying increases.

In addition, by optimizing the lowering speed (immersion speed) under the immersion condition in the solution containing the primer compound, specifically, by making the lowering speed slower than a speed of upward infiltration of the solution containing the primer compound with respect to the valve acting metal substrate 10A having the porous portion, the impregnation property into the porous portion is improved, and thus the adhesion amount of the primer compound after drying increases.
  (6) The valve acting metal substrate 10A is immersed in a dispersion liquid containing a conductive polymer constituting the second solid electrolyte layer to be impregnated with the dispersion liquid, thereby forming the second solid electrolyte layer in the region shown in FIG. 4B. After immersion, a drying treatment is performed.

In the drying treatment, when the strip-shaped valve acting metal substrate 10A is dried in a state of being inverted by 180 degrees during drying, a solution containing the solid electrolyte tends to accumulate in the vicinity of the insulating mask layer 30, so that the thickness of the second solid electrolyte layer after drying increases due to the crosslinking reaction with the primer compound. When the 180 degree inversion in the drying treatment in (5) is performed, the crosslinking reaction with the primer compound is further promoted, so that although the thickness of the second solid electrolyte layer after drying increases, only optimization of the immersion condition is also effective. As a result, the equivalent series resistance (ESR) described later is improved.

The second solid electrolyte layer is formed by impregnating the valve acting metal substrate with a dispersion liquid having a higher concentration of the conductive polymer than the first solid electrolyte layer.

According to (5) or (6), in the solid electrolyte layer 40, the thickness of the negative electrode portion 32 in the vicinity of the insulating mask layer 30 is larger than the thickness of the central region of the negative electrode portion 32.
  (7) The strip-shaped valve acting metal substrate 10A is washed with pure water to remove an excessive primer compound. After washing, a drying treatment is performed.

(8) The carbon layer 50 is formed in a region shown in FIG. 4C by immersing the valve acting metal substrate 10A in the carbon paste. After immersion, a drying treatment is performed.

(9) The negative conductor layer 60 is formed in a region shown in FIG. 1 by immersing the valve acting metal substrate 10A in a silver paste. After immersion, a drying treatment is performed.

Comparative Examples

Figure 20:
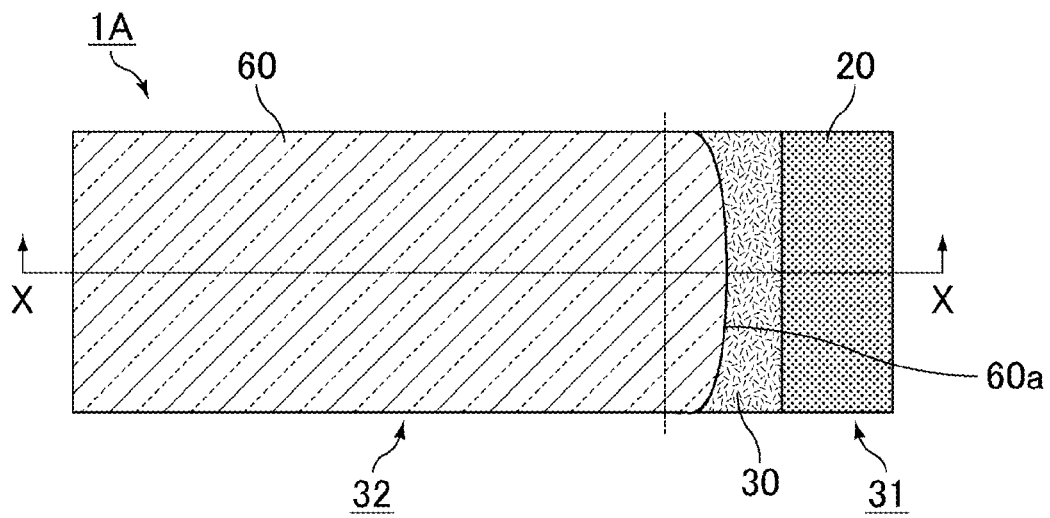
FIG. 20 is a plan view schematically showing an example of the solid electrolytic capacitor element according to Comparative Example.
Figure 21:
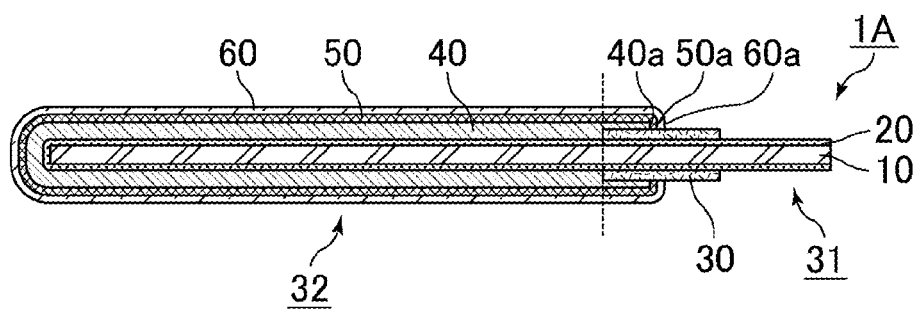
FIG. 21 is a cross-sectional view taken along line X-X of the solid electrolytic capacitor element shown in FIG. 20.

As Comparative Examples 1 to 10, a total of ten solid electrolytic capacitor elements 1A shown in FIGS. 20 and 21 were prepared. The preparation method is the same as in Examples.

FIG. 20 is a plan view schematically showing an example of the solid electrolytic capacitor element according to Comparative Example. FIG. 21 is a cross-sectional view taken along line X-X of the solid electrolytic capacitor element shown in FIG. 20.

The solid electrolytic capacitor element 1A shown in FIGS. 20 and 21 includes: a valve acting metal substrate 10 having a dielectric layer 20 on its surface; an insulating mask layer 30 provided on the dielectric layer 20; a solid electrolyte layer 40 provided on the dielectric layer 20; a carbon layer 50 provided on the solid electrolyte layer 40; and a negative conductor layer 60 provided on the carbon layer 50.

Figure 22A:
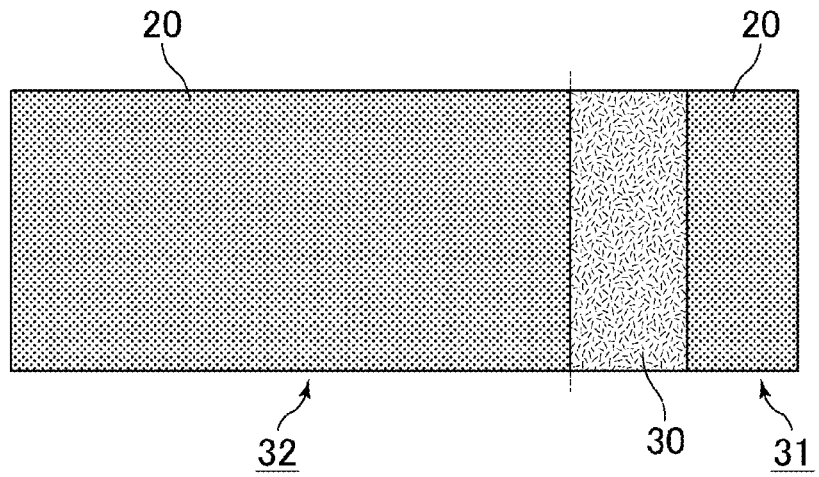
FIG. 22A is a plan view schematically showing an example of the dielectric layer and the insulating mask layer constituting the solid electrolytic capacitor element shown in FIG. 20.
Figure 22B:
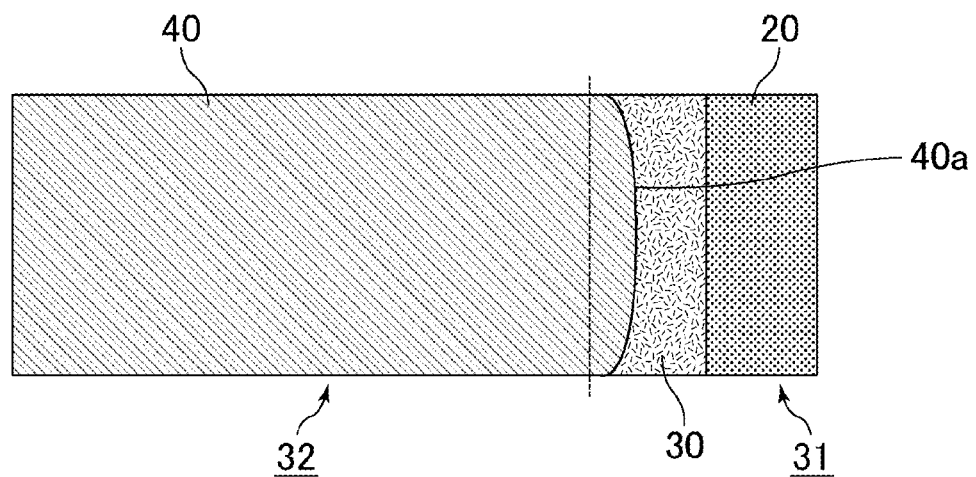
FIG. 22B is a plan view schematically showing an example of the dielectric layer, the insulating mask layer, and the solid electrolyte layer constituting the solid electrolytic capacitor element shown in FIG. 20.
Figure 22C:
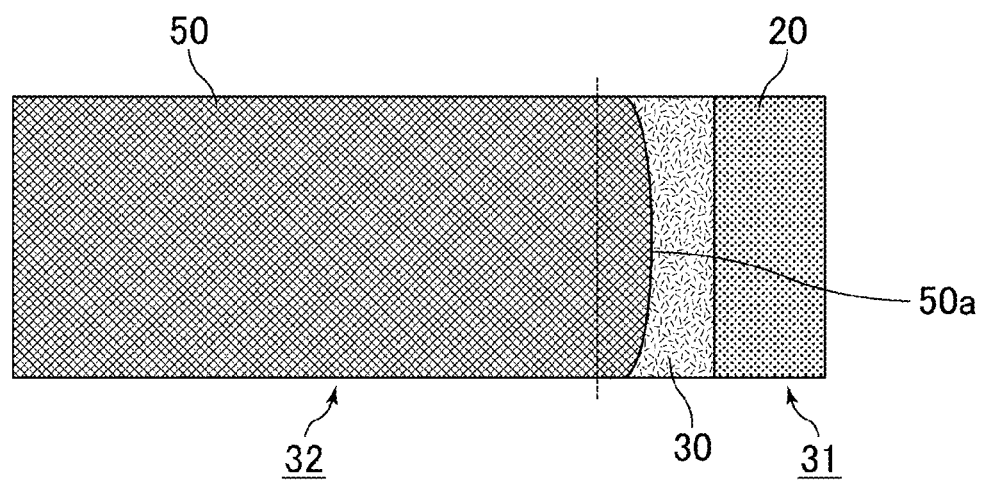
FIG. 22C is a plan view schematically showing an example of the dielectric layer, the insulating mask layer, the solid electrolyte layer, and the carbon layer constituting the solid electrolytic capacitor element shown in FIG. 20.

FIG. 22A is a plan view schematically showing an example of the dielectric layer and the insulating mask layer constituting the solid electrolytic capacitor element shown in FIG. 20. FIG. 22B is a plan view schematically showing an example of the dielectric layer, the insulating mask layer, and the solid electrolyte layer constituting the solid electrolytic capacitor element shown in FIG. 20. FIG. 22C is a plan view schematically showing an example of the dielectric layer, the insulating mask layer, the solid electrolyte layer, and the carbon layer constituting the solid electrolytic capacitor element shown in FIG. 20.

As shown in FIGS. 20, 21, and 22A, the insulating mask layer 30 having a predetermined width is circumferentially provided on the dielectric layer 20. The insulating mask layer 30 is provided on both main surfaces and both side surfaces of the valve acting metal substrate 10 along a short side of the valve acting metal substrate 10. The valve acting metal substrate 10 is separated into the positive electrode portion 31 and the negative electrode portion 32 by the insulating mask layer 30.

As shown in FIGS. 20, 21, and 22B, the solid electrolyte layer 40 is provided on the dielectric layer 20 in the negative electrode portion 32. The solid electrolyte layer 40 is provided such that a tip covers an outer surface of the insulating mask layer 30. The solid electrolyte layer 40 may be provided so as to cover a part of the outer surface of the insulating mask layer 30, or may be provided so as to cover the entire outer surface of the insulating mask layer 30.

As shown in FIGS. 20, 21, and 22C, the carbon layer 50 is provided such that the tip 50a covers the outer surface of the insulating mask layer 30, and is provided such that the tip 50a covers the same position as the tip 40a of the solid electrolyte layer 40 on the outer surface of the insulating mask layer 30.

As shown in FIGS. 20 and 21, the negative conductor layer 60 is provided such that the tip 60a covers the same position as the tip 50a of the carbon layer 50 on the outer surface of the insulating mask layer 30.

As shown in FIGS. 20 and 21, the negative conductor layer-non-formed region where the negative conductor layer 60 does not cover a part of the carbon layer 50 does not exist in the negative electrode portion 32.

[Evaluation of Solid Electrolytic Capacitor Element]

For the solid electrolytic capacitor elements of Examples 1 to 10 and Comparative Examples 1 to 10, the electrostatic capacity at 120 Hz, the equivalent series resistance (ESR) at 100 kHz, and the leakage current (LC) were measured as initial characteristics. The leakage current was measured 2 minutes after a rated voltage of 16 V was applied. Regarding the electrostatic capacity and the ESR, an average value (Avg) and a standard deviation (σ) were calculated. With regard to the LC, a sample in which the LC was less than 5 µA was rated as good, a sample in which the LC was 5 µA or more and less than 200 µA was rated as acceptable, and a sample in which the LC was 200 µA or more and a short circuit occurred was rated as unacceptable. The results are shown in Table 1.

TABLE 1

| | Electrostatic capacity [µF] | Electrostatic capacity Avg | Electrostatic capacity σ | ESR [mΩ] | ESR Avg | ESR σ | LC [µA] | Rating of LC |
|---|---|---|---|---|---|---|---|---|
| Example 1 | 17.8 | 18.1 | 0.3 | 32.5 | 29.8 | 3.3 | 0.2 | Good |
| Example 2 | 18.1 | | | 34.1 | | | 0.1 | Good |
| Example 3 | 18.4 | | | 31.7 | | | 1.1 | Good |
| Example 4 | 17.6 | | | 28.7 | | | 0.9 | Good |
| Example 5 | 17.9 | | | 26.4 | | | 0.8 | Good |
| Example 6 | 18.1 | | | 34.8 | | | 5.9 | Acceptable |
| Example 7 | 18.6 | | | 27.2 | | | 0.8 | Good |
| Example 8 | 17.9 | | | 25.8 | | | 0.5 | Good |
| Example 9 | 17.9 | | | 29.6 | | | 14.6 | Acceptable |
| Example 10 | 18.2 | | | 27.3 | | | 0.1 | Good |
| Comparative Example 1 | 17.1 | 17.5 | 0.3 | 39.4 | 37.9 | 3.5 | 45.9 | Acceptable |
| Comparative Example 2 | 17.3 | | | 31.3 | | | 0.1 | Good |
| Comparative Example 3 | 17.8 | | | 38.7 | | | 15872 | Unacceptable |
| Comparative Example 4 | 17.5 | | | 40.3 | | | 1.6 | Good |
| Comparative Example 5 | 17.1 | | | 35.9 | | | 14668 | Unacceptable |
| Comparative Example 6 | 17.9 | | | 42.2 | | | 78.1 | Acceptable |

TABLE 1-continued

|  | Electrostatic capacity [μF] | Electrostatic capacity Avg | Electrostatic capacity σ | ESR [mΩ] | ESR Avg | ESR σ | LC [μA] | Rating of LC |
|---|---|---|---|---|---|---|---|---|
| Comparative Example 7 | 17.7 |  |  | 39.4 |  |  | 155 | Acceptable |
| Comparative Example 8 | 17.4 |  |  | 41.7 |  |  | 14461 | Unacceptable |
| Comparative Example 9 | 17.8 |  |  | 33.4 |  |  | 25.9 | Acceptable |
| Comparative Example 10 | 17.6 |  |  | 36.6 |  |  | 15378 | Unacceptable |

Table 1 shows that the solid electrolytic capacitor element according to Example has a lower equivalent series resistance and less leakage current defects than the solid electrolytic capacitor element according to Comparative Example.

REFERENCE SIGNS LIST 1, 1A, 2, 3 solid electrolytic capacitor element
10, 10A valve acting metal substrate
11 element portion
12 support portion
20 dielectric layer
30 insulating mask layer
31 positive electrode portion
32 negative electrode portion
40 solid electrolyte layer
40a tip of solid electrolyte layer
40b solid electrolyte layer provided in central region of negative electrode portion
40c solid electrolyte layer provided in region in contact with insulating mask layer in negative electrode portion
50 carbon layer
50a tip of carbon layer
60 negative conductor layer
60a tip of negative conductor layer
70 treatment liquid
75 treatment tank
100 solid electrolytic capacitor
110 exterior body
110a first main surface
110b second main surface
110c first side surface
110d second side surface
110e first end surface
110f second end surface
120 first external electrode
130 second external electrode
A1, A2 negative conductor layer-non-formed region

The invention claimed is:

1. A solid electrolytic capacitor element comprising:
a valve acting metal substrate having a dielectric layer on at least one main surface thereof;
an insulating mask layer on the dielectric layer and separating the valve acting metal substrate into a positive electrode portion and a negative electrode portion;
a solid electrolyte layer on the dielectric layer in the negative electrode portion, wherein a tip of the solid electrolyte layer covers at least a part of an outer surface of the insulating mask layer;
a carbon layer on the solid electrolyte layer, wherein a tip of the carbon layer covers a same position as the tip of the solid electrolyte layer or a position closer to the negative electrode portion relative to the tip of the solid electrolyte layer on the outer surface of the insulating mask layer; and
a negative conductor layer on the carbon layer, wherein a tip of the negative conductor layer covers a position closer to the negative electrode portion relative to the tip of the carbon layer on the outer surface of the insulating mask layer,
wherein the negative electrode portion has a negative conductor layer-non-formed region where the negative conductor layer does not cover a part of the carbon layer.

2. The solid electrolytic capacitor element according to claim 1, wherein, when viewed from a normal direction of the at least one main surface of the valve acting metal substrate, a middle portion of the tip of the negative conductor layer is located on the insulating mask layer and opposed end portions of the tip of the negative conductor layer are located on the negative electrode portion.

3. The solid electrolytic capacitor element according to claim 2, wherein, when viewed from the normal direction of the at least one main surface of the valve acting metal substrate, the negative conductor layer approaches the insulating mask layer from the opposed end portions of the tip of the negative conductor layer toward the middle portion of the tip of the negative conductor layer.

4. The solid electrolytic capacitor element according to claim 1, wherein, when viewed from a normal direction of the at least one main surface of the valve acting metal substrate, the negative conductor layer approaches the insulating mask layer from opposed end portions of the tip of the negative conductor layer toward a middle portion of the tip of the negative conductor layer.

5. The solid electrolytic capacitor element according to claim 1, wherein a first thickness of the solid electrolyte layer in a region in contact with the insulating mask layer in the negative electrode portion is larger than a second thickness of the solid electrolyte layer in a central region of the negative electrode portion.

6. The solid electrolytic capacitor element according to claim 1, wherein the solid electrolyte layer includes a first solid electrolyte layer on the dielectric layer and a second solid electrolyte layer on the first solid electrolyte layer, and a content of a second conductive polymer in the second solid electrolyte layer is larger than a content of a first conductive polymer in the first solid electrolyte layer.

7. The solid electrolytic capacitor element according to claim 1, wherein the negative conductor layer is a silver layer.

8. The solid electrolytic capacitor element according to claim 1, wherein the tip of the carbon layer covers the same position as the tip of the solid electrolyte layer.

9. The solid electrolytic capacitor element according to claim 1, wherein the tip of the carbon layer is closer to the negative electrode portion relative to the tip of the solid electrolyte layer on the outer surface of the insulating mask layer.

10. The solid electrolytic capacitor element according to claim 1, wherein an apex of the tip of the negative conductor layer is located at a same position as an apex of the tip of the carbon layer.

11. A solid electrolytic capacitor comprising:
the solid electrolytic capacitor element according to claim 1;
an exterior body sealing the solid electrolytic capacitor element;
a first external electrode electrically connected to the valve acting metal substrate of the solid electrolytic capacitor element exposed from the exterior body; and
a second external electrode electrically connected to the negative conductor layer of the solid electrolytic capacitor element exposed from the exterior body.

12. The solid electrolytic capacitor according to claim 11, wherein, in the solid electrolytic capacitor element, when viewed from a normal direction of the at least one main surface of the valve acting metal substrate, a middle portion of the tip of the negative conductor layer is located on the insulating mask layer and opposed end portions of the tip of the negative conductor layer are located on the negative electrode portion.

13. The solid electrolytic capacitor according to claim 12, wherein, in the solid electrolytic capacitor element, when viewed from the normal direction of the at least one main surface of the valve acting metal substrate, the negative conductor layer approaches the insulating mask layer from the opposed end portions of the tip of the negative conductor layer toward the middle portion of the tip of the negative conductor layer.

14. The solid electrolytic capacitor according to claim 11, wherein, in the solid electrolytic capacitor element, when viewed from a normal direction of the at least one main surface of the valve acting metal substrate, the negative conductor layer approaches the insulating mask layer from opposed end portions of the tip of the negative conductor layer toward a middle portion of the tip of the negative conductor layer.

15. The solid electrolytic capacitor according to claim 11, wherein, in the solid electrolytic capacitor element, a first thickness of the solid electrolyte layer in a region in contact with the insulating mask layer in the negative electrode portion is larger than a second thickness of the solid electrolyte layer in a central region of the negative electrode portion.

16. The solid electrolytic capacitor according to claim 11, wherein, in the solid electrolytic capacitor element, the solid electrolyte layer includes a first solid electrolyte layer on the dielectric layer and a second solid electrolyte layer on the first solid electrolyte layer, and a content of a second conductive polymer in the second solid electrolyte layer is larger than a content of a first conductive polymer in the first solid electrolyte layer.

17. The solid electrolytic capacitor according to claim 11, wherein, in the solid electrolytic capacitor element, the negative conductor layer is a silver layer.

18. The solid electrolytic capacitor according to claim 11, wherein, in the solid electrolytic capacitor element, the tip of the carbon layer covers the same position as the tip of the solid electrolyte layer.

19. The solid electrolytic capacitor according to claim 11, wherein, in the solid electrolytic capacitor element, the tip of the carbon layer is closer to the negative electrode portion relative to the tip of the solid electrolyte layer on the outer surface of the insulating mask layer.

20. The solid electrolytic capacitor according to claim 11, wherein, in the solid electrolytic capacitor element, an apex of the tip of the negative conductor layer is located at a same position as an apex of the tip of the carbon layer.

\* \* \* \* \*